(12) United States Patent
De Vogel et al.

(10) Patent No.: US 11,381,200 B2
(45) Date of Patent: Jul. 5, 2022

(54) DEVICE AND METHOD FOR ALIGNING A SOLAR PANEL WITH RESPECT TO A ROOF-MOUNTED INSTALLATION RAIL PRIOR TO INSTALLATION

(71) Applicant: Esdec B.V., Deventer (NL)

(72) Inventors: Vincent De Vogel, Deventer (NL); Jeroen De Vogel, Deventer (NL); Frank Van Regteren, Deventer (NL)

(73) Assignee: Esdec B.V., Deventer (NL)

( * ) Notice: Subject to any disclaimer, the term of this patent is extended or adjusted under 35 U.S.C. 154(b) by 0 days.

(21) Appl. No.: 16/493,127

(22) PCT Filed: Mar. 12, 2018

(86) PCT No.: PCT/NL2018/050153
§ 371 (c)(1),
(2) Date: Sep. 11, 2019

(87) PCT Pub. No.: WO2018/169391
PCT Pub. Date: Sep. 20, 2018

(65) Prior Publication Data
US 2020/0083839 A1 Mar. 12, 2020

(30) Foreign Application Priority Data
Mar. 13, 2017 (NL) .................................... 2018502

(51) Int. Cl.
*H02S 30/10* (2014.01)
*H02S 20/23* (2014.01)
(Continued)

(52) U.S. Cl.
CPC .............. *H02S 30/10* (2014.12); *H02S 20/23* (2014.12); *F16K 3/184* (2013.01); *F16K 3/186* (2013.01);
(Continued)

(58) Field of Classification Search
CPC .......... H02S 30/10; H02S 20/23; H02S 40/34; H02S 40/345; H02S 40/36; F16K 3/186;
(Continued)

(56) References Cited

U.S. PATENT DOCUMENTS

2011/0299957 A1 12/2011 Young
2012/0199181 A1* 8/2012 Newman ................. F24S 25/61
136/251

(Continued)

FOREIGN PATENT DOCUMENTS

DE 102014007971 A 12/2015
EP 2224185 A1 9/2010
(Continued)

*Primary Examiner* — Michael Y Sun
(74) *Attorney, Agent, or Firm* — The Webb Law Firm

(57) ABSTRACT

The invention relates to a device (1) for aligning a solar panel (20) with respect to an installation rail which is attached to a base, in particular a roof, prior to installation. The invention also relates to an assembly comprising at least one solar panel (20) and at least one such device (1) which is coupled to a frame (21) of the solar panel (20). The invention furthermore relates to a method for aligning a solar panel (20), with respect to an installation rail attached to a base, in particular a roof, prior to installation by using at least one such device (1), optionally followed by the installation of the at least one solar panel (20) to the support rail.

11 Claims, 4 Drawing Sheets

(51) Int. Cl.
  *F16K 3/18* (2006.01)
  *F16K 3/20* (2006.01)
  *F16K 7/16* (2006.01)
  *F16K 7/06* (2006.01)

(52) U.S. Cl.
  CPC ............... *F16K 3/205* (2013.01); *F16K 7/06* (2013.01); *F16K 7/16* (2013.01)

(58) Field of Classification Search
  CPC . F16K 3/205; F16K 3/184; F16K 7/16; F16K 7/06; Y02E 10/50; Y02E 10/47; Y02B 10/20; Y02B 10/10; F24S 25/634; F24S 2025/801; F24S 2025/6004; F24S 25/632; F24S 25/20; F24S 25/33; H01R 4/4827; H01R 4/4836; H01R 4/4845; H01R 4/4854; H01R 4/4863; H01R 4/4872
  See application file for complete search history.

(56) References Cited

U.S. PATENT DOCUMENTS

| | | |
|---|---|---|
| 2013/0102165 A1 | 4/2013 | DuPont |
| 2013/0299659 A1 | 11/2013 | Sader |
| 2015/0102194 A1 | 4/2015 | Liu |
| 2015/0180404 A1* | 6/2015 | Braunstein ............ H02S 20/23 136/251 |
| 2015/0357967 A1* | 12/2015 | Brennan ................ F24S 25/30 136/251 |
| 2016/0111999 A1 | 4/2016 | Stapleton |
| 2018/0156496 A1* | 6/2018 | Chevrier ............... F24S 40/80 |
| 2019/0186518 A1* | 6/2019 | Legall .................. F16B 5/0635 |

FOREIGN PATENT DOCUMENTS

| | | | |
|---|---|---|---|
| FR | 3036748 A1 | 7/2017 | |
| WO | 2013092905 A1 | 6/2013 | |
| WO | WO-2016193614 A1 * | 12/2016 | ........... F24S 25/634 |
| WO | 2018024951 A1 | 2/2018 | |

* cited by examiner

DEVICE AND METHOD FOR ALIGNING A SOLAR PANEL WITH RESPECT TO A ROOF-MOUNTED INSTALLATION RAIL PRIOR TO INSTALLATION

CROSS-REFERENCE TO RELATED APPLICATIONS

This application is the United States national phase of International Application No. PCT/NL2018/050153 filed Mar. 12, 2018, and claims priority to Dutch Patent Application No. 2018502 filed Mar. 13, 2017, the disclosures of which are hereby incorporated by reference in their entirety.

BACKGROUND OF THE INVENTION

Field of the Invention

The invention relates to a device for aligning a solar panel with respect to an installation rail attached to a base, in particular a roof, prior to installation. The invention also relates to an assembly comprising at least one solar panel and at least one device according to the invention which is coupled to a frame of the solar panel. The invention furthermore relates to a method for aligning a solar panel with respect to an installation rail attached to a base, in particular a roof, prior to installation by using at least one device according to the invention, optionally followed by the installation of the at least one solar panel to the support rail.

Description of Related Art

Solar panels usually comprise a number of series-connected solar cells which are able to convert light energy (solar energy) into useful usable electrical energy. In this case, the interconnected solar cells are positioned in one plane, with the assembly of solar cells forming part of a laminate of various layers, in which an upper layer is usually formed by a glass panel. The laminate is surrounded by a frame which is usually made of aluminium, as a result of which a solar panel is produced which is relatively easy to transport and can be installed on installation rails which are attached to a base, in particular a roof. Since the positioning of the solar panel with respect to the installation rail(s), to which the solar panel is to be attached, is usually very important, in particular if a series of solar panels are to be installed next to each other on the installation rails, there is a need for a user-friendly auxiliary means to be able to align solar panels to be attached with respect to the installation rail(s) prior to installation, so that each solar panel can be more easily attached to the installation rails in a desired orientation.

It is an object of the invention to provide a relatively user-friendly auxiliary means to be able to align solar panels with respect to the installation rails prior to installation on one or more installation rails situated underneath.

SUMMARY OF THE INVENTION

To this end, the invention provides a device comprising: at least one carrying structure, at least one primary receiving space which is at least partly surrounded by the carrying structure and configured for receiving an edge of a frame of a solar panel, and at least one securing element which is resiliently connected to the carrying structure in order to substantially fix the device with respect to the solar panel, wherein at least a part of the securing element is configured to cooperate with a recess which is provided in the frame of the solar panel, wherein at least a part of the carrying structure forms a supporting surface for hanging the device coupled to a solar panel on an installation rail attached to a base, in particular a roof. The device according to the invention is configured to cooperate with a solar panel in such a way that the solar panel can easily and securely be aligned with respect to an installation rail (situated underneath), after which the solar panel is (permanently) attached to the installation rail, usually in a mechanical way. This alignment is based on the place-selective cooperation of the device and the frame of the solar panel, wherein the device is substantially fixed with respect to the frame and thus with respect to the solar panel, after which the device may be used to hang the assembly of the device and the solar panel connected to the device from an installation rail. After this relatively secure alignment, wherein the assembly is situated loose on top of one or more support rails, the solar panel can be attached to the one or more installation rails in a relatively simple manner and in the desired position, usually by means of mechanical fastening means, such as screws and/or clamps. Since the securing element of the device cooperates with a recess provided in the frame of the solar panel, in particular a (round or slot-shaped) opening, it is important to arrange the recess in the correct position in the frame beforehand and/or, if the frame is provided with several recesses, to allow the device to cooperate with the recess which eventually leads to the alignment of the solar panel with respect to the installation rail(s) in the desired manner. If the recess is formed by a slot-shaped opening, then it is preferred if the slot-shaped opening has a limited length, usually between 8 and 12 millimetres, in particular circa 10 millimetres. The corresponding device may optionally temporarily be connected to a solar panel. Usually, the device will not be removed from the solar panel after installation of the solar panel on the installation rail. An additional advantage in this case is the fact that, if the (mechanical) attachment of the solar panel to one or more installation rails situated underneath should fail, the solar panel will continue to hang from the installation rail(s) by means of the at least one device connected to the solar panel, as a result of which it is possible to prevent sliding of the solar panel from the installation rail(s) as much as possible, which is very advantageous from a safety point of view and an economic point of view. In many cases, several devices are used for each solar panel to align the solar panel with respect to one or more installation rails (also referred to as support rails) to which the solar panel is to be connected. Usually in this case, at least one device is fitted on each side of the two sides of the frame. Fitting the device is usually relatively simple. While the device is being pushed (fitted) over a part of the frame, with the frame part being accommodated in the primary receiving space, the securing element will usually (simultaneously) cooperate with a recess in the frame of the solar panel, as a result of which the device is fixed with respect to the solar panel. In this case, no tools or expertise are required.

The supporting surface forms a contact surface for directly or indirectly engaging with a (side) wall of an installation rail, via, for example, an additional material layer, such as a protective layer. In this case, the supporting surface will usually be oriented in a downward direction during use and cooperate with a part of the installation rail which is oriented in an upward direction, as a result of which a hanging effect may be achieved. Usually, at least a part of a peripheral wall (outer wall) of the carrying structure will form a supporting surface for hanging the device coupled to a solar panel on an installation rail attached to a base, in particular a roof. In a position in which the supporting surface is coupled with a solar panel, it projects in a downward direction with respect to the solar panel, as a result of which the supporting surface may act as a stop and/or hook and/or cam for hanging the assembly from the one or more installation rails.

Preferably, the primary receiving space is positioned between an upper part of the carrying structure and a bottom part of the carrying structure. In the position in which the upper part of the carrying structure is coupled to a solar panel, it is preferably surrounded by the frame of the solar panel, and in the position in which the bottom part of the carrying structure is coupled to a solar panel, it preferably projects with respect to the frame of the solar panel in a direction turned away from the solar panel (downward direction). Usually, the upper part and the bottom part of the carrying structure are mutually connected by means of a longitudinal edge and/or side wall, for example a rear wall or partition wall of the carrying structure. More preferably, at least one supporting surface is formed by at least a part of the bottom part of the carrying structure, for hanging the device coupled to a solar panel on an installation rail attached to a base, in particular a roof. It is conceivable for several supporting surfaces to be used in the device. Which supporting surface or which supporting surfaces are used as contact surface with the installation rail during use depends on the design of the carrying structure, the positioning of the device with respect to the solar panel and the design of the installation rail. At least one supporting surface preferably extends in at least one direction which is substantially perpendicular to a plane defined by the primary receiving space. As the primary receiving space is usually oriented substantially parallel to a central surface of the solar panel during use, the supporting surface which is substantially perpendicular thereto will usually engage with the installation rail in a secure manner, in particular if the installation rail has a substantially square cross section. In this case, it is advantageous if the at least one supporting surface is substantially flat.

The carrying structure is optionally provided with at least one laterally projecting element, in particular a laterally projecting edge, which laterally projecting element is configured to cooperate in a stabilizing manner with a groove provided in an installation rail and/or a receiving space for a part of the device according to the invention which is surrounded by the installation rail, in particular the laterally projecting element of the device according to the invention.

Preferably, the primary receiving space is substantially slit-shaped. This design is usually particularly suitable for at least partly surrounding a freely protruding edge of the frame of the solar panel in a relatively tight manner. This freely protruding edge of the frame of the solar panel may be surrounded so tightly that the carrying structure exerts a clamping force or prestress on the frame, which may further benefit the mutual fixing of the device and the solar panel. The depth of the primary receiving space is preferably greater, preferably at least 5 times greater, than the height of the primary receiving space. In addition to providing tight surrounding, such a design also ensures that a part of the frame, preferably a free frame edge, can be pushed (inserted) sufficiently far into the receiving space, which benefits the stability of the coupling between the device and the solar panel. The, preferably slit-shaped, primary receiving space usually encloses a plane which is substantially perpendicular to a longitudinal axis of the device.

In a preferred embodiment, the securing element comprises at least one resilient lip, at least one end of which resilient lip is connected to the carrying structure, in such a way that at least a part of the securing element is positioned in the primary receiving space. Usually, the recess provided in the frame of the solar panel will (thus) also be positioned in the receiving space in order to be able to cooperate with the securing element in the receiving space. The securing element preferably comprises at least one resilient lip, which resilient lip is connected at one end to the carrying structure and is provided with at least one projecting securing cam, preferably at the opposite end, wherein at least a part of the securing cam is positioned in the primary receiving space. In this case, the securing cam is configured to at least partly be accommodated in the recess provided in the frame of the solar panel (often formed by an opening or hole). In this case, it is preferred if the height of the securing cam is greater than the height of the primary receiving space, in such a way that the securing cam—in a load-free state—completely penetrates the primary receiving space.

Preferably, the securing element is connected to the upper part of the carrying structure. Such a positioning and connection of the securing element protects the (possibly delicate) securing element against weather conditions and external impacts. It is in this case also preferred if the securing element is substantially completely surrounded by the upper part of the carrying structure. Preferably, the securing cam in this case, at least in load-free state, projects into a space surrounded by the bottom part of the carrying structure. Obviously, the reversed variant embodiment is also conceivable, wherein the securing element is connected to the bottom part of the carrying structure and, if desired, projects into a space surrounded by the upper part of the carrying structure. Such a complete penetration of the primary receiving space of the securing cam usually benefits the securing and fixing action of the securing cam, and thus the device as such. In many cases, the securing cam will be situated at a distance from the upper part of the carrying structure. This means that a (limited) free space is present around the securing cam in order to be able to (temporarily) displace the securing cam while coupling the device and a solar panel. Preferably, one end of the resilient lip is connected to a rear part of the carrying structure, with the at least one projecting securing cam being positioned in a front part of the carrying structure. As a result thereof, the securing cam is turned towards the actual access to the primary receiving space, and the frame of the solar panel will make contact with the securing cam relatively quickly, possibly immediately, while (a part of) the frame is pushed into the receiving space and displace the securing cam until the recess in the frame has been aligned with the securing cam, as a result of which the securing cam will at least partly rebound. In order to facilitate pushing the frame into the primary receiving space, it is advantageous if a part of the securing cam which is facing away from the rear part of the carrying structure is provided with a bevelled guiding surface. The securing cam is preferably configured to be displaced in a direction which is substantially perpendicular to a plane defined by the primary receiving space. Due to the resilience of the securing element, the securing element will tend to position the securing cam in the original position, which benefits the securing action of the securing element. Preferably, the securing cam is displaceable between a locking position, in which at least a part of the securing cam is situated in the primary receiving space, and a non-locking position, in which the securing cam is situated substantially at a distance from the primary receiving space. In the load-free state, the securing cam is usually in a locking position. Preferably, at least one, and preferably every other side wall of the securing cam extends substantially perpendicular to a plane defined by the primary receiving space. The use of one or more (vertically) upright other (side) walls of the securing cam has the advantage that a click-fit connection (snap connection) can be achieved when passing the recess provided in the frame, which results in a securing effect. In addition, such one or more upright (side) walls have the advantage that a relatively efficient lateral boundary may be formed for the frame which prevents the frame from being relatively easily uncoupled with respect to the device in the lateral direction.

Preferably, the device also comprises at least one secondary receiving space which is situated at a distance from the primary receiving space and serves for accommodating cables. By using the secondary receiving space, the device according to the invention has an additional function (as cable holder). The at least one secondary receiving space is preferably at least partly delimited by at least one flexible leg which is connected to the carrying structure. The flexible leg may exert a clamping force on cables accommodated in the secondary receiving space, as a result of which the cables can be held more securely. Optionally, the at least one flexible leg may be used to limit access to the secondary receiving space, as a result of which cables be removed from the secondary receiving space less easily.

In this case, it is advantageous if the width of the access to the at least one secondary receiving space is smaller than the width of a part of the secondary receiving space which is situated at a distance from the access.

It is preferable if the device is made in one piece, which usually greatly benefits the production and handling of the device. Preferably, the device is at least partly made of plastic, if desired by means of injection-moulding.

The invention also relates to an assembly comprising at least one solar panel and at least one device according to the invention which is coupled to a frame of the solar panel, wherein the at least one securing element of the device cooperates with at least one recess provided in the frame, in such a way that the device is substantially fixed with respect to the solar panel.

The invention furthermore relates to a method for aligning a solar panel (prior to installation) with respect to at least one installation rail attached to a base, in particular a roof, by using at least one device according to the invention, comprising the following steps: A) pushing at least one device over a part, preferably an edge, of a frame of a solar panel, in such a way that at least a part of the frame is accommodated in the primary receiving space of the at least one device, B) allowing cooperation of the at least one securing element of the at least one device with at least one recess provided in the frame, in particular an opening, in such a way that the at least one device is substantially fixed with respect to the solar panel, C) positioning the assembly of the solar panel and the at least one device coupled to the solar panel on at least one installation rail, and D) allowing the assembly to hang from at least one installation rail via the at least one supporting surface of the at least one device. In this case, at least one recess, in particular an opening, is provided in the frame in a place-selective manner, preferably before executing step B). The one or more recesses may optionally also already be provided during the production of the frame. Preferably, several devices are used and coupled to the frame during steps A)-D). More preferably, the several devices are provided on opposite (side) edges of the frame of the solar panel during step A). Further advantages of the method have already been described above and will be described in detail below.

In addition, the invention relates to a method for attaching a solar panel to at least one installation rail, comprising carrying out the method for aligning a solar panel with respect to an installation rail according to the invention attached to a base, in particular a roof, and the subsequent mechanical attachment of the solar panel to the at least one installation rail.

BRIEF DESCRIPTION OF THE DRAWINGS

The invention will be explained by means of non-limiting exemplary embodiments illustrated in the following figures, in which.

DESCRIPTION OF THE INVENTION

Figure 1A:
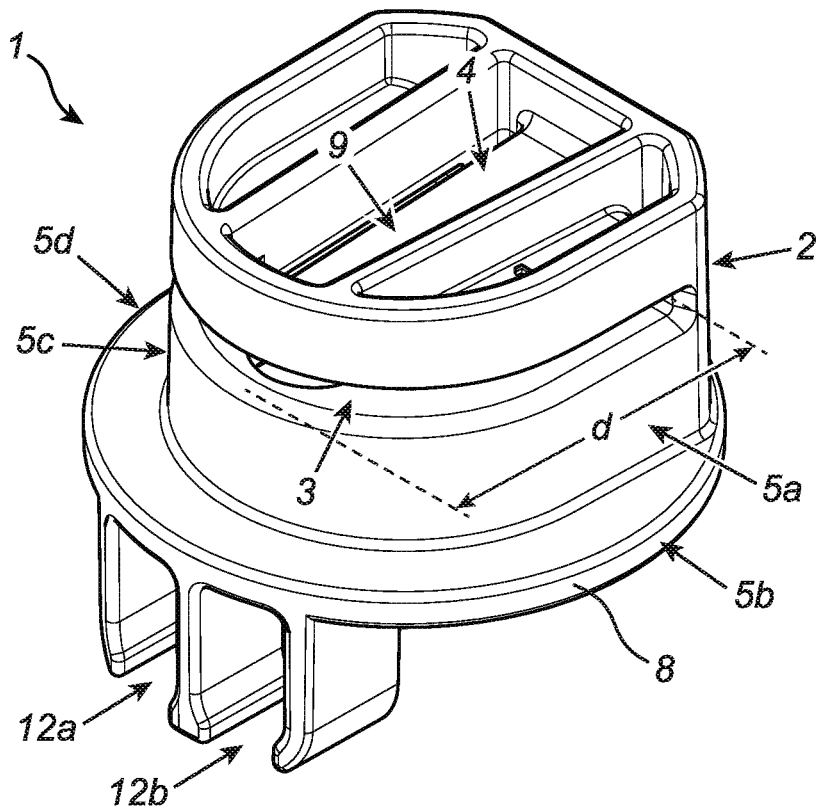
FIGS. 1a and 1b show perspective views of a device according to the invention.
Figure 1B:
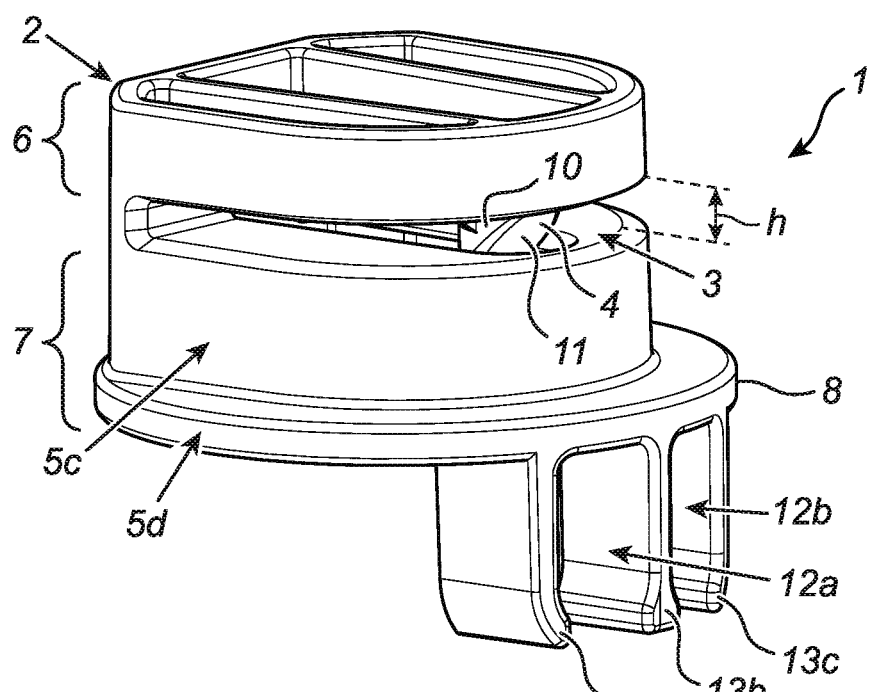

FIG. 1a and FIG. 1b both show a perspective view of a device (1) for aligning a solar panel with respect to an installation rail according to the invention attached to a base, in particular a roof, prior to installation. The device (1) comprises a carrying structure (2), a primary receiving space (3) which is partly surrounded by the carrying structure (2) and is configured for receiving an edge of a frame of a solar panel (not shown) and a securing element (4) which is resiliently connected to the carrying structure (2) for substantially fixing the device (1) with respect to the solar panel. The primary receiving space (3) is substantially slit-shaped and is positioned between an upper part (6) of the carrying structure (2) and a bottom part (7) of the carrying structure (2). The depth (d) of the primary receiving space (3) is greater than the height (h) of the primary receiving space (3). The securing element (4) comprises a resilient lip (9), one end of which is connected to the carrying structure (2), in particular to the rear wall of the carrying structure (2). The securing element (4) is in this case at least partly positioned in the primary receiving space (3). On an opposite side of the connection between the carrying structure (2) and the resilient lip (9), the securing element (4) is provided with a projecting securing cam (10). The projecting securing cam (10) is also positioned in the primary receiving space (3), with the height of the securing cam (10) being greater than the height (h) of the primary receiving space (3) in the illustrated embodiment, with the securing cam (10) completely penetrating the primary receiving space (3). A part of the securing cam (10) which faces away from the carrying structure (2) is provided with a bevelled guiding surface (11). This bevelled guiding surface (11) will facilitate the arrangement of the device (1) on a frame of a solar panel, as the bevelled guiding surface (11) will guide the part of the frame of the solar panel to be accommodated in the primary receiving space (3) when pushing the device (1) onto a solar panel, in which case the resilient lip (9) will be displaced.

The further side walls of the securing cam (10) extend substantially perpendicular with respect to a plane defined by the primary receiving space (3).

The bottom part (7) of the carrying structure (2) comprises several possible supporting surfaces (5a, 5b, 5c, 5d) for hanging a device (1) which is coupled to a solar panel from an installation rail attached to a base, in particular a roof. As several parts of the bottom part (7) of the carrying structure (2) are configured as and can function as supporting surfaces, the device (1) is suitable for cooperation with virtually all possible combinations of solar panels and carrying structures. In the illustrated embodiment, the opposite sides of the bottom part (7) of the carrying structure (2) are both provided with supporting surfaces (5a, 5b, 5c, 5d), in which case at least one of the supporting surfaces (5a, 5b, 5c, 5d) will rest on part of an installation rail attached to a base, in particular a roof, in a position in which the carrying structure (2) is coupled to a solar panel. The supporting surfaces (5a, 5b, 5c, 5d) extend in at least one direction which is substantially perpendicular to a plane defined by the primary receiving space (3). In the illustrated embodiment of the device (1), two supporting surfaces (5a, 5c) are substantially flat in this case.

The flat geometry of a supporting surface (5) may improve the alignment of a solar panel. The carrying structure (2) is provided with a laterally projecting element (8), in particular a laterally projecting edge (8). In the illustrated embodiment, the laterally projecting edge (8) comprises two supporting surfaces (5b, 5d). The device (1) also comprises secondary receiving spaces (12a, 12b) which are arranged at a distance from the primary receiving space (3) and serve for accommodating cables (not shown). The secondary receiving spaces (12a, 12b) are arranged on the bottom part (7) of the carrying structure (2) and are in this case partly delimited by legs (13a, 13b, 13c) connected to the carrying structure (2). The legs (13a, 13b, 13c) are preferably flexible. The width of the access to each secondary receiving space (12a, 12b) is greater than the width of a part of the secondary receiving space (12a, 12b) which is situated at a distance from the access.

In the illustrated embodiment, the device (1) is substantially symmetrical. A rear side of the upper part (6) of the carrying structure (2) and a rear side of the bottom part (7) of the carrying structure (2) are mutually connected. More particularly, the illustrated device is made in one piece. The upper part (6) of the carrying structure (2) and the bottom part (7) of the carrying structure (2) are in this case connected by means of a rear wall of the carrying structure (2).

Figure 2A:
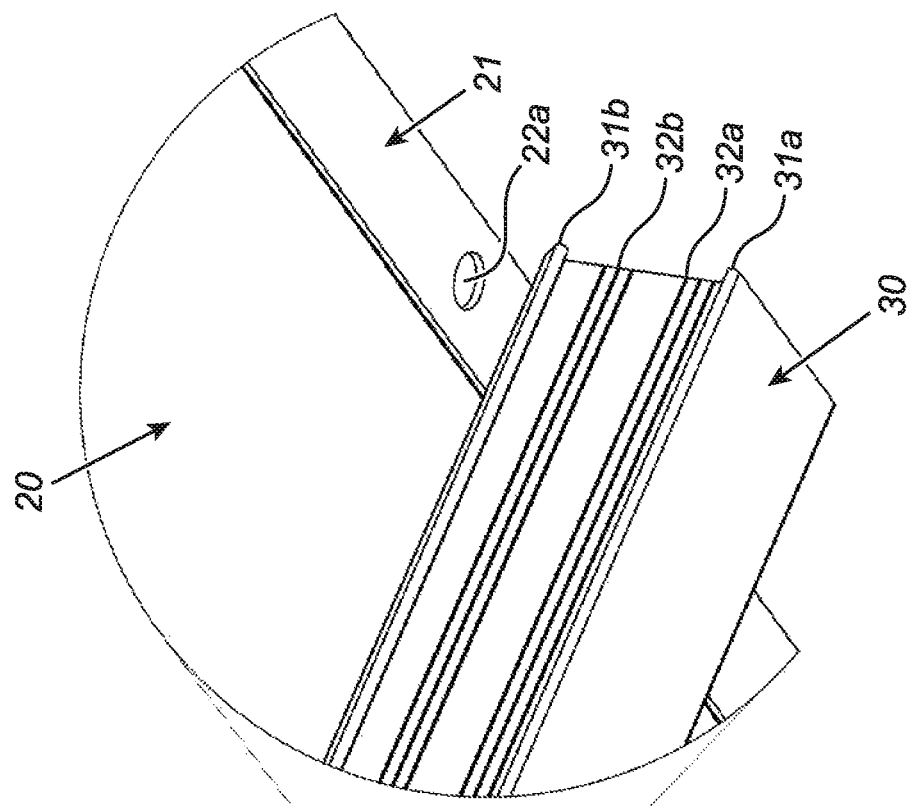
FIG. 2a shows a perspective view of an assembly of a solar panel and an installation rail.

FIG. 2a shows a perspective view of an assembly of a solar panel (20) and an installation rail (30) attached to a base, in particular a roof (not shown). The solar panel (20) is provided with a frame (21), with the solar panel (20) engaging with the installation rail (30) by means of the frame (21). The installation rail (30) comprises a profiled side wall provided with two projecting structures (31a, 31b) and several grooves (32a, 32b). Several recesses (22a, 22b, 22c, 22d) are provided in the frame (21) of the solar panel (20). These recesses (22a, 22b, 22c, 22d) are each configured to cooperate with a securing element of a device according to the invention (not shown). In the illustrated embodiment, the recesses (22a, 22b, 22c, 22d) are of a round design.

Figure 2B:
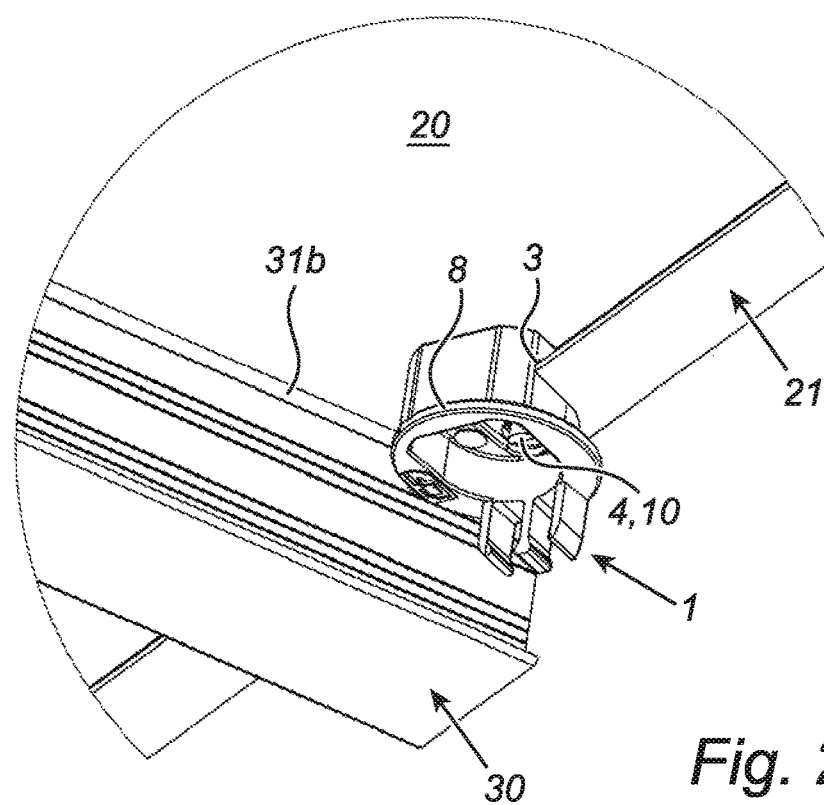
FIG. 2b shows the assembly from FIG. 2a and a device as illustrated in FIGS. 1a and 1b.

FIG. 2b shows a perspective view of the assembly as illustrated in FIG. 2a and a device (1) according to the invention as illustrated in FIGS. 1a and 1b. Identical elements of the device (1) are denoted by the same reference numerals as in FIGS. 1a and 1b.

The device (1) is fixed with respect to the solar panel (20) due to the fact that a part of the frame (21) of the solar panel (20) is accommodated in the primary receiving space (3) of the carrying structure (2) and that the securing element (4) in this case cooperates with the recess (22a) provided in the frame (21). In the illustrated situation, the securing cam (10) is in a locked position. In this case, the securing cam (10) is accommodated in the recess (22a) in the frame (21), in which case the design of the securing cam (10) is adapted to the design of the recess (22a). A part of the frame (21) is accommodated in the primary receiving space (3) of the carrying structure (2), in which case the carrying structure (2) engages multilaterally with the frame (21). In this case, the laterally projecting edge (8) of the carrying structure (2), together with the frame (21), forms a receiving space for a part of the projecting structure (31b) of the installation rail (30). In this case, the laterally projecting edge (8) also cooperates with the groove (32b) provided in the installation rail (30), with the installation rail (30) resting on the supporting surface of the projecting edge (8) at the location of the groove (32b). Therefore, the solar panel (20) hangs from the installation rail (30) by means of the device (1) coupled to the solar panel (2), in which case the device rests on the installation rail (30) by means of at least one supporting surface (5a, 5b, 5c, 5d). Preferably, at least one device (1) according to the invention is attached to a solar panel (20) before the solar panel (20) is placed on an installation rail (30) attached to a base, in particular a roof.

Figure 2C:
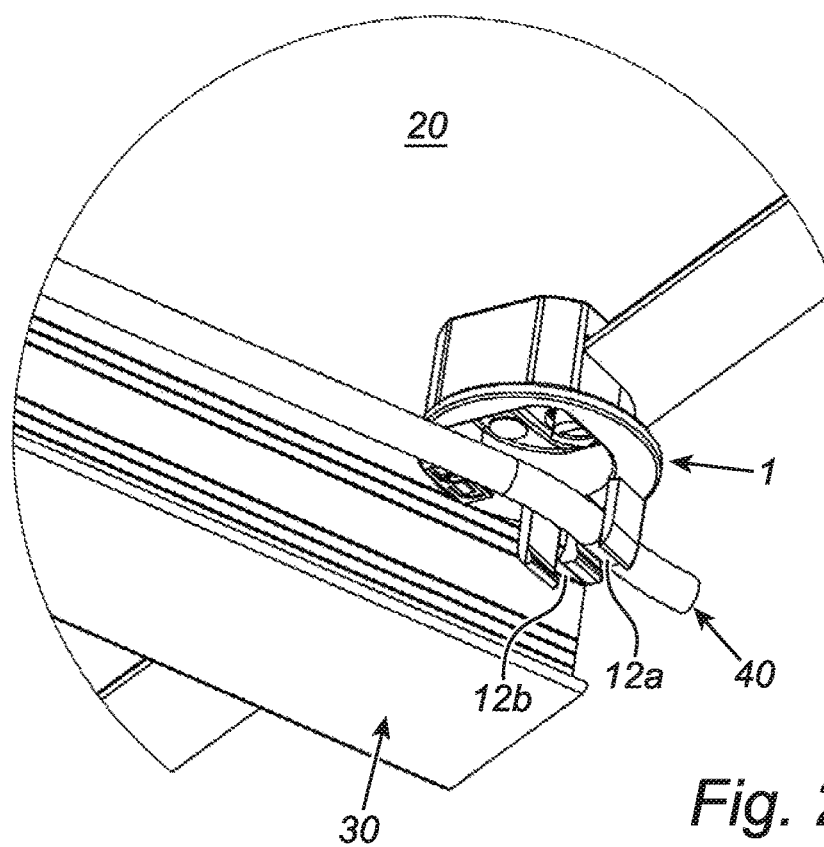
FIG. 2c shows the assembly from FIG. 2b and cables of the solar panel.

FIG. 2c shows a perspective view of an assembly from FIG. 2b in combination with cables (40) of the solar panel (20). The cable (40) is accommodated in the secondary receiving space (12a) of the carrying structure (2). The secondary receiving spaces (12a, 12b) are positioned at a distance from the supporting surfaces (5a, 5b, 5c, 5d), so that the risk of the cables (40) becoming trapped between the installation rail (30) and the device (1) and/or the solar panel (20) is minimal. In addition, the secondary receiving spaces (12a, 12b) are positioned in such a way that the cables run in the length direction of the installation rail (30).

Figure 3:
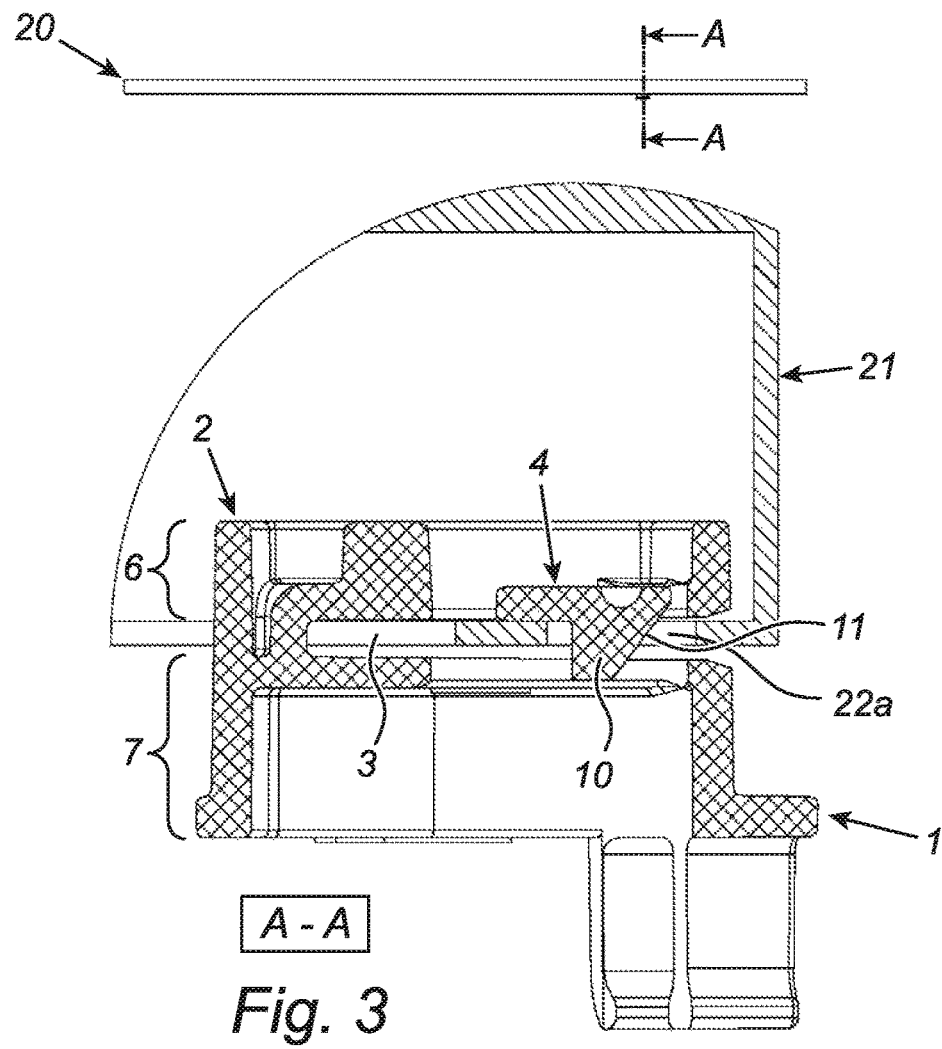
FIG. 3 shows a cross section of an assembly of the device as illustrated in FIGS. 1a and 1b and a solar panel.

FIG. 3 shows a cross section of an assembly of the device (1) as illustrated in the preceding figures and a solar panel (20). In combination with the securing cam (10) of the securing element (4), the resilient lip (9) cooperates with a recess (22a) provided in the frame (21) of the solar panel (20). In this case, the securing cam (10) comprises a bevelled guiding surface (11). The figure shows that the upper part (6) of the carrying structure (2) is situated substantially in a space surrounded by the frame (21) of the solar panel (20). The bottom part (7) of the carrying structure (2) is situated substantially outside the frame of the solar panel (20).

Figure 4:
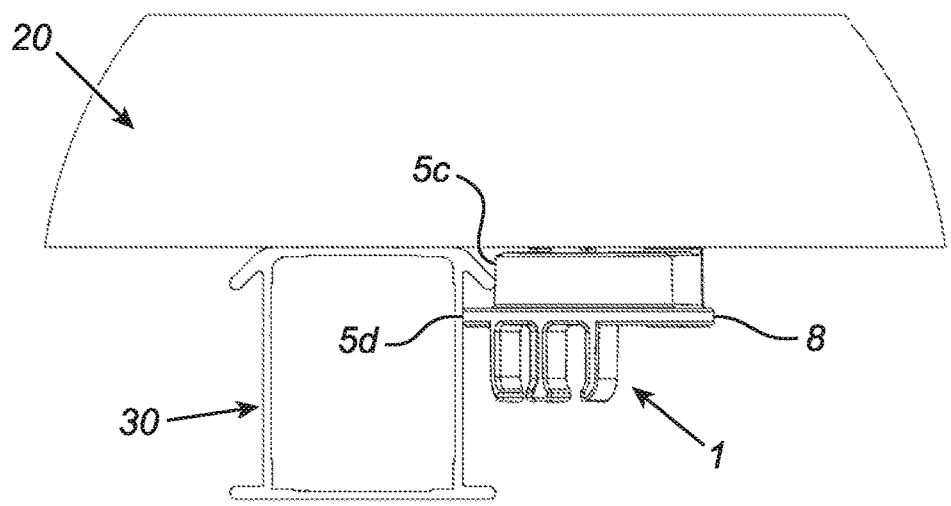
FIG. 4 shows a side view of the assembly as illustrated in FIG. 2b.

FIG. 4 shows a side view of an assembly of the device (1), the solar panel (20) and the installation rail (30) as illustrated in FIG. 2b. In the illustrated configuration, the device (1) engages with the installation rail (30) by means of two supporting surfaces (5c, 5d). In this case, the laterally projecting edge (8) ensures the desired alignment of the solar panel (20) with respect to the installation rail (30). The multiple engagement between the device (1) and the installation rail (30) ensures that a stable hanging connection can be achieved between the solar panel (2) and the installation rail (30).

It will be clear that the invention is not limited to the exemplary embodiments which are illustrated and described here, but that countless variants are possible within the framework of the attached claims, which will be obvious to the person skilled in the art. In this case, it is conceivable for different inventive concepts and/or technical measures of the above-described variant embodiments to be completely or partly combined without departing from the inventive idea described in the attached claims.

The verb 'comprise' and its conjugations as used in this patent document are understood to mean not only 'comprise', but to also include the expressions 'contain', 'substantially contain', 'formed by' and conjugations thereof.

The invention claimed is:

1. A device for aligning a solar panel with respect to an installation rail attached to a base prior to installation, comprising:
   at least one carrying structure,
   at least one primary receiving space which is at least partly surrounded by the carrying structure and configured for receiving an edge of a frame of the solar panel, and
   at least one securing element, wherein the at least one securing element comprises at least one resilient lip, wherein one end of the at least one resilient lip is resiliently connected to the at least one carrying structure and an opposite end of the at least one resilient lip comprises at least one projecting securing cam, wherein at least a part of the at least one projecting securing cam is positioned in the primary receiving space, and wherein the at least one projecting securing cam is configured to cooperate with a recess which is provided in the frame of the solar panel to substantially fix the device with respect to the solar panel,
   wherein at least a part of a peripheral wall of the carrying structure forms a supporting surface for hanging the device coupled to the solar panel on the installation rail attached to the base, wherein the supporting surface extends in at least one direction which is substantially perpendicular to a plane defined by the primary receiving space.

2. The device according to claim 1, wherein the primary receiving space is positioned between an upper part of the carrying structure and a bottom part of the carrying structure, wherein, in the position in which the upper part of the carrying structure is coupled to the solar panel, the carrying structure is surrounded by the frame of the solar panel, and wherein, in the position in which the bottom part of the carrying structure is coupled to the solar panel, the carrying structure projects with respect to the frame of the solar panel in a downward direction.

3. The device according to claim 2, wherein at least a part of the bottom part of the carrying structure forms a supporting surface for hanging the device coupled to the solar panel on the installation rail attached to base.

4. The device according to claim 1, wherein at least one supporting surface is substantially flat.

5. The device according to claim 1, wherein the carrying structure is provided with at least one laterally projecting element which is configured to cooperate in a stabilizing manner with a groove provided in the installation rail.

6. The device according to claim 1, wherein a height of the securing cam is greater than a height of the primary receiving space, in such a way that the securing cam completely penetrates the primary receiving space.

7. The device according to claim 6, wherein the securing element is connected to the upper part of the carrying structure, and wherein the securing cam projects into a space surrounded by the bottom part of the carrying structure, and wherein the securing cam is situated at a distance from the upper part of the carrying structure.

8. The device according to claim 1, wherein one end of the at least one resilient lip is connected to a rear part of the carrying structure, and wherein the at least one projecting securing cam is positioned in a front part of the carrying structure, and wherein a part of the securing cam facing away from the rear part of the carrying structure is provided with a bevelled guiding surface, and wherein at least one side wall of the securing cam is substantially perpendicular to the plane defined by the primary receiving space.

9. The device according to claim 1, wherein the securing cam is configured to be displaced in a direction which is substantially perpendicular to the plane defined by the primary receiving space.

10. The device according to claim 1, wherein the securing cam is displaceable between a locking position, in which at least a part of the securing cam is situated in the primary receiving space, and a non-locking position, in which the securing cam is situated substantially at a distance from the primary receiving space.

11. An assembly comprising at least one solar panel and at least one device according to claim 1 which is coupled to a frame of the solar panel, wherein the at least one securing element of the device cooperates with at least one recess provided in the frame, in such a way that the device is substantially fixed with respect to the solar panel.

* * * * *